United States Patent [19]

Iwao

[11] 4,418,676
[45] Dec. 6, 1983

[54] CARBURETION SYSTEM FOR A V-TYPE INTERNAL COMBUSTION ENGINE

[75] Inventor: Suminari Iwao, Tokyo, Japan

[73] Assignee: Honda Giken Kogyo Kabushiki Kaisha, Tokyo, Japan

[21] Appl. No.: 409,530

[22] Filed: Aug. 19, 1982

[30] Foreign Application Priority Data

Aug. 19, 1981 [JP] Japan ................. 56-130585

[51] Int. Cl.³ ............................................. F02B 13/00
[52] U.S. Cl. ................................ 123/580; 123/52 MV
[58] Field of Search ............ 123/59 PC, 579, 52 MV, 123/55 VX, 55 VE, 55 VF, 580

[56] References Cited

FOREIGN PATENT DOCUMENTS

| | | | |
|---|---|---|---|
| 663379 | 5/1963 | Canada ........................ | 123/52 MV |
| 55-161948 | 12/1980 | Japan ............................. | 123/580 |
| 56-72229 | 6/1981 | Japan ............................. | 123/579 |

*Primary Examiner*—Charles J. Myhre
*Assistant Examiner*—E. Rollins Cross

*Attorney, Agent, or Firm*—Armstrong, Nikaido, Marmelstein & Kubovcik

[57] ABSTRACT

An improved carburetion system for a V-type internal combustion engine including a first carburetor and a second carburetor disposed in a space between a first cylinder and a second cylinder arranged in the form of V-shape and adapted to supply an air-fuel mixture to the respective cylinders. The respective carburetors each includes an intake barrel and a float chamber in which fuel to be supplied to said intake barrel is stored, said intake barrel having an inlet port and an outlet port and defining an intake passage leading to the associated cylinder. The intake barrels of both the carburetors are arranged in the ultimate proximity of one another in such a manner that they intersect one another and a point of intersection of the intake barrels is offset from the middle part of the intake barrels toward the inlet port of the latter. Thus, the respective float chambers are located in a space between both the intake barrels below the point of intersection.

4 Claims, 4 Drawing Figures

CARBURETION SYSTEM FOR A V-TYPE INTERNAL COMBUSTION ENGINE

BACKGROUND OF THE INVENTION

1. Field of the Invention

The present invention relates to an improved carburetion system for a V-type internal combustion engine mounted on a vehicle including a first cylinder and a second cylinder which are arranged in the form of V-shape and more particularly to a carburetion system including a first carburetor and a second carburetor which are arranged in the space between the first and second cylinders to constitute an intake system for the cylinders.

2. Description of the Prior Art

To satisfactorily utilize an inertia effect of intake air and thereby ensure an increased air intake efficiency of the engine it has been required long since to design an intake passage in a predetermined length having the minimized curvature thereof, said intake passage extending from an inlet port of the intake barrel of the carburetor to an inlet port of the intake valve of the engine. However, it has been found that it is very difficult to dispose intake barrels and float chambers of the first and second carburetors in a limited space between the first and second cylinders of the V-type internal combustion engine while meeting the requirement as described above.

SUMMARY OF THE INVENTION

The present invention is intended to obviate the drawback inherent to the conventional carburetion system of the above kind. Thus, it is a principal object of the present invention to provide an improved carburetion system for a V-type internal combustion engine which is constructed such that the intake barrels of the first and second carburetors are arranged in the ultimate proximity of one another in such a manner that they intersect one another and a point of intersection of the intake barrels is offset from the middle part of the intake barrels toward the inlet port of the latter so that the float chambers are located in a limited space between both the intake barrels below the point of intersection in order to satisfactorily meet the above-mentioned requirement.

The above and other objects and advantageous features of the present invention will be readily understood from the reading of the following description made in connection with the accompanying drawings.

BRIEF DESCRIPTION OF THE DRAWINGS

FIG. 1 is a schematic elevational side view of a V-type internal combustion engine equipped with a carburetion system in accordance with the present invention and FIGS. 2 to 4 illustrate the carburetion system in FIG. 1, shown in an enlarged scale, wherein FIG. 2 is a vertical sectional side view of the carburetion system taken in line II—II in FIG. 4, FIG. 3 is a partial sectional view of the carburetion system taken in line III—III in FIG. 2 and FIG. 4 is a sectional plan view of the carburetion system taken in line IV—IV in FIG. 2.

DESCRIPTION OF THE PREFERRED EMBODIMENT

Now the present invention will be described in more details with reference to the accompanying drawings which illustrate a preferred embodiment of the present invention.

Figure 1:
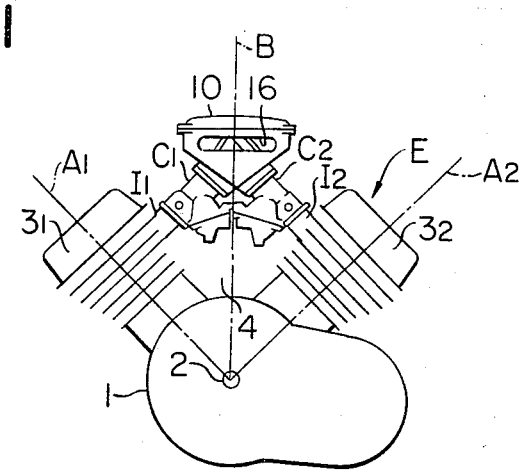

Referring first to FIG. 1, a motorcycle mounts a V-type internal combustion engine identified by reference letter E which includes a crank case 1 with a crankshaft 2 held therein, said crankshaft 2 extending transversely of the frame of the motorcycle. The engine E has two cylinders: namely, a first cylinder $3_1$ and a second cylinder $3_2$ which are arranged longitudinally of the frame of the motorcycle in the form of V-shape. A first carburetor $C_1$ and a second carburetor $C_2$ constituting intake systems for the first and second cylinders $3_1$ and $3_2$ are arranged in a V-shaped space formed between both the cylinders $3_1$ and $3_2$. In the illustrated embodiment the engine E includes two cylinders and two carburetors but the present invention should not be limited only to this and it does not exclude such a case where two or more first cylinders as well as two or more second cylinders are arranged in the axial direction relative to the crankshaft 2 together with the corresponding numbers of carburetors.

When neglecting the axial offset between both the cylinders $3_1$ and $3_2$, the first carburetor $C_1$ and the second carburetor $C_2$ are arranged in symmetry with respect to a bisector line B of the angle involved between both the axes $A_1$ and $A_2$ of the first and second cylinders $3_1$ and $3_2$.

Figure 2:
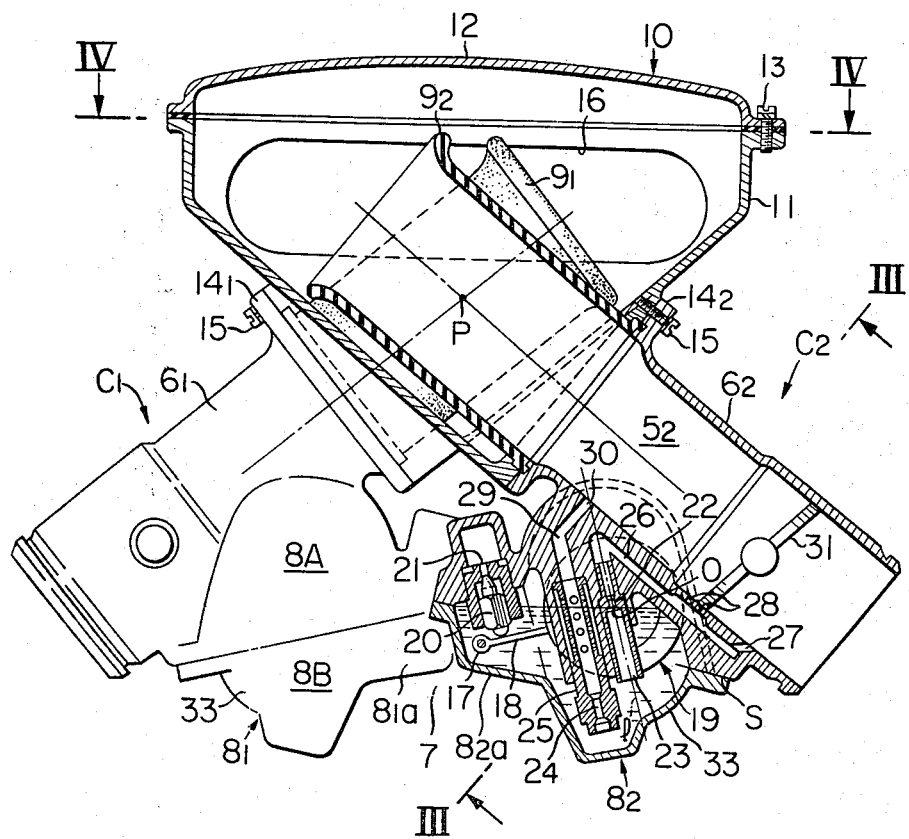
Figure 4:
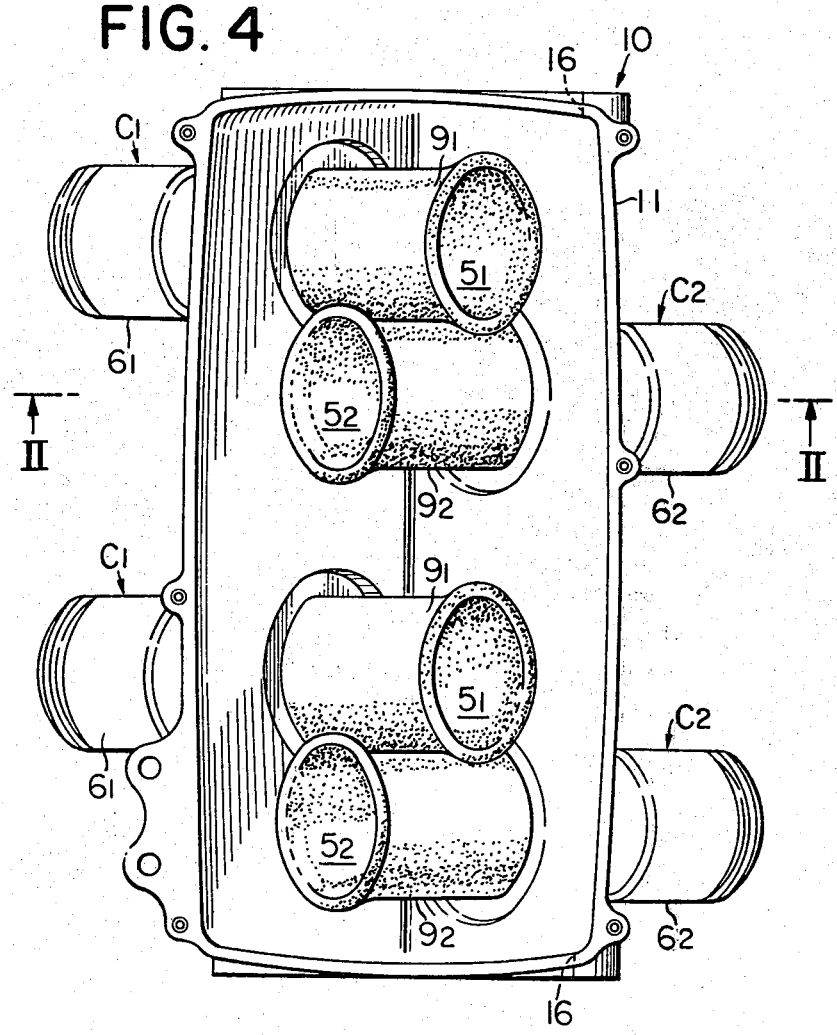

As will be seen from FIGS. 2 and 4, the first carburetor $C_1$ and the second carburetor $C_2$ include intake barrels $6_1$ and $6_2$ defining therein their intake passages $5_1$ and $5_2$. The intake barrels $6_1$ and $6_2$ extend at a substantially right angle relative to the axes $A_1$ and $A_2$ of the first and second cylinders respectively. The intake barrels $6_1$ and $6_2$ arranged side by side are inclined relative to the horizontal plane. It is preferable that these intake barrels are arranged in such a manner as to contact one another and intersect one another at a predetermined angle as illustrated in the accompanying drawings. The intake barrels $6_1$ and $6_2$ are connected to the corresponding cylinders $3_1$ and $3_2$ by way of thermal insulating sleeves $I_1$ and $I_2$ made of rubber or the like material.

The point P of intersection of both the intake barrels $6_1$ and $6_2$ is offset from the middle part of the intake barrels toward the inlet port side of the same whereby an ample space 7 is formed below the point P of intersection between both the intake barrels $6_1$ and $6_2$. Further, float chambers $8_1$ and $8_2$ annexed to the carburetors $C_1$ and $C_2$ are disposed in said space 7. As shown in FIGS. 2 and 4, the float chambers $8_1$ and $8_2$ are provided with extension chambers $8_{1a}$ and $8_{2a}$ which are projected toward the opposite one so that a required volume is ensured for the respective float chambers $8_1$ and $8_2$.

Each of the float chambers $8_1$ and $8_2$ is constructed of a float chamber body 8A formed integrally with the lower part of the intake barrels $6_1$ and $6_2$ and opened at the lower face thereof and a lower cover 8B adapted to be jointed to the lower open face of the float chamber body 8A and the jointing surface S between the float chamber body 8A and the lower cover 8B is inclined relative to the horizontal plane at an angle of inclination smaller than that of the intake barrels $6_1$ and $6_2$.

Figure 3:
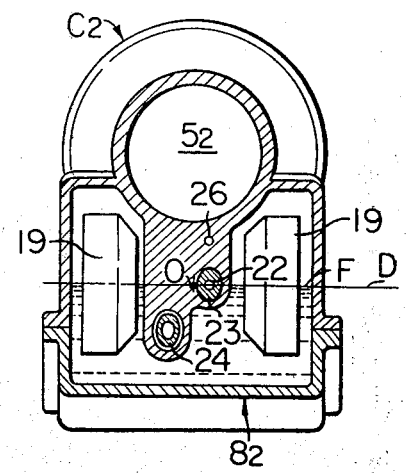

Each of the float chambers $8_1$ and $8_2$ accommodates therein a pair of floats 19 which are connected to one another by way of a swingable arm 18. This swingable arm 18 is supported by means of a pivotal shaft 17 for ensuring a free swinging movement thereof in the vertical direction. The pivotal shaft 17 is rotatably supported by means of bearings provided integrally with the float chamber body 8A constituting a part of the extension chamber $8_{1a}$ and extends in parallel to the crankshaft 2. Each of the extension chambers $8_{1a}$ and $8_{2a}$ includes a fuel inlet port 21 which opens at the lower face of the float chamber body 8A. A float valve 20 is operatively connected to the swinging arm 18 so as to open or close the fuel inlet port 21 in accordance with the upward or downward movement of the swinging arm 18. Accordingly, as a level of fuel in the float chambers $8_1$ and $8_2$ is lowered due to consumption of fuel, the float 19 is lowered and thereby the float valve 20 is caused to open. Then, fuel is supplied into the float chambers $8_1$ and $8_2$ from a fuel tank (not shown) by way of the fuel inlet port 21 until the predetermined level of fuel is restored in the respective float chambers $8_1$ and $8_2$. As shown in FIG. 3, the fuel surface is identified by reference letter F and the center of the fuel surface, that is, the position where no change in fuel level occurs irrespective of any inclination of the fuel surface F is identified by reference letter O.

Each of the pair of floats 19 has a cylindrical or frusto-conical or composite form of the preceding ones of which center axis D extends in parallel to the axis of the crankshaft 2. Specifically, the floats 19 are designed such that a draft line passes the center of the floats 19 when the latter floats on the fuel surface F. The pair of floats 19 are arranged such that the center O of the fuel surface F is located at the middle position therebetween. Thus, the floats 19 do not move up or down irrespective of any inclination of the fuel surface F in any direction but they move only in conformance with a substantial change in the level of the fuel surface F.

Each of the float chambers $8_1$ and $8_2$ includes a slow fuel pipe 23 with a slow jet 22 incorporated therein and a main fuel pipe 25 with a main jet 24 incorporated therein, said fuel pipes 23 and 25 being inclined at a certain angle relative to the axis of the intake passages $5_1$ and $5_2$ and extending through the float chamber body 8A. Specifically, the slow fuel pipe 23 is arranged such that its axis extends as close as possible to the center O of the fuel surface, whereas the main fuel pipe 25 is arranged such that its axis extends in parallel to that of the slow fuel pipe 23, passing as close as possible by the center O of the fuel surface. Thus, the floats 19 move up or down in parallel to the axis of the slow fuel pipe 23 in the vicinity of the center O of the fuel surface in response to change in the level of the fuel surface. The slow fuel pipe 23 is connected to an idle port 27 and a bypass port 28 at the upper end thereof by way of a fuel passage 26, said idle port 27 and bypass port 28 being opened toward the respective intake passages $5_1$ and $5_2$. On the other hand, the main fuel pipe 25 is connected to a main nozzle 30 at the upper end thereof by way of a fuel passage 29, said main nozzle 30 being opened to the respective intake passages $5_1$ and $5_2$. Specifically, the main nozzle 30 is located at a substantially right angle relative to the respective intake passages $5_1$ and $5_2$. Reference numeral 31 designates a throttle valve disposed in the respective intake passages $5_1$ and $5_2$.

As will be seen from FIGS. 2 and 3, the upper portion of the intake barrels $6_1$ and $6_2$ at which the latter intersect one another is constituted of air horns $9_1$ and $9_2$ made of rubber or the like material, said air horns $9_1$ and $9_2$ being housed in a common intake box 10 having a substantially triangular cross-sectional configuration and extending in parallel to the crankshaft 2. The intake box 10 is constituted of a housing 11 opened at its upper end part and a lid 12 adapted to be fixedly secured to the upper face of said housing 11 by means of set screws 13 so as to close the upper open end therewith. Further, the intake box 10 is formed with mounting flanges at the lower part of the housing 11 to which mating flanges $14_1$ and $14_2$ provided at the intermediate portion of the intake barrels $6_1$ and $6_2$ are firmly secured by means of set screws 15. Thus, all the carburetors $C_1$ and $C_2$ are connected integrally to each other by way of the common intake box 10. The housing 11 of the common intake box 10 is formed with air intake openings 16 at both the left- and right-hand side walls, said air intake openings 16 being fitted with an air cleaner (not shown) respectively.

Now, assembling of the carburetion system constructed in the above-described manner will be described below. First, the mounting flanges $14_1$ and $14_2$ of the carburetors $C_1$ and $C_2$ are fixedly secured to the housing 11 by tightening the set screw 15 and then the air horns $9_1$ and $9_2$ are firmly fitted into the annular groove on the mounting flanges $14_1$ and $14_2$ within the housing 11. Finally, the lid 12 is fixedly secured to the upper flange of the housing by tightening the set screws 13. Thus, it will be readily understood that the above-described arrangement allows the intake barrels $6_1$ and $6_2$ to be easily assembled in such a manner that they intersect one another.

During idling or slow speed running of the engine E with the throttle valve 31 of both the carburetors $C_1$ and $C_2$ held at the idle opening or reduced opening fuel stored in the float chambers $8_1$ and $8_2$ is sucked up through the slow fuel pipe 23. After it is metered at the slow jet 22, it is introduced into the intake passages $5_1$ and $5_2$ through the idle port 27 or the bypass port 28 by way of the fuel passage 26. Then, atomized fuel is mixed with intake air whereby an air-fuel mixture having a density required for the idling or low speed running of the engine is prepared. The mixture is then introduced into the respective cylinders $3_1$ and $3_2$.

As the engine is operated at a high speed with the throttle valve 31 opened to an increased extent, fuel in the float chambers $8_1$ and $8_2$ is sucked up by way of the main fuel pipe 23. After it is metered at the main jet 24, it is introduced into the intake passages $5_1$ and $5_2$ through the main nozzle 30 by way of the fuel passage 29 and then atomized fuel is mixed with intake air whereby an air-fuel mixture having a density required for the high speed running of the engine is prepared. The mixture is then introduced into the respective cylinders $3_1$ and $3_2$.

As described above, the carburetion system in accordance with the present invention is constructed such that the first and second carburetors are disposed between the first and second cylinders arranged in the form of V-shape in such a manner that their intake barrels intersect one another at a substantially right angle and are located as close as possible to one another. Accordingly, it is possible to dispose the intake barrels of the first and second carburetors in the limited space between the first and second cylinders without any necessity for bending the intake barrels having a predetermined length. As a result an inertia effect of intake air is satisfactorily utilized and thereby an increased output from the engine is ensured.

Further, owing to the arrangement that the intake barrels of the first and second carburetors intersect one another the inlet ports of both the intake barrels are caused to open in the opposite direction. Thus, very few interference of intake air is caused in spite of the arrangement of the intake barrels in the ultimate proximity of one another, resulting in steady supply of the air-fuel mixture from the carburetors to the cylinders.

Further, owing to the arrangement that the intake barrels are located in the ultimate proximity of one another it is ensured that the width of the whole carburetion system is reduced to the minimum while the intake barrels are disposed in the limited space between the first and second cylinders.

Furthermore, owing to the arrangement that the point of intersection of both the intake barrels is offset from the middle part of the intake barrels toward the inlet ports thereof so as to create an ample space for the float chambers of the first and second carburetors between both the intake barrels below the point of intersection of the latter it is ensured that the float chambers having a sufficient volume of inside space are provided between both the intake barrels which intersect one another, resulting in steady preparation of the mixture of intake air and atomized fuel in the intake barrels.

What is claimed is:

1. In an improved carburetion system for a V-type internal combustion engine comprising a first carburetor and a second carburetor disposed in a space between a first cylinder and a second cylinder arranged in the form of V-shape and adapted to supply an air-fuel mixture to the respective cylinders, said carburetors each including an intake barrel and a float chamber in which fuel to be supplied to said intake barrel is stored, said intake barrel having an inlet port and an outlet port and defining an intake passage leading to the associated cylinder, the improvement wherein the intake barrels of both the carburetors are arranged in the ultimate proximity of one another in such a manner that they intersect one another and a point of intersection of the intake barrels is offset from the middle part of the intake barrels toward the inlet port of the latter so that the float chambers are located in a space between both the intake barrels below the point of intersection.

2. A carburetion system as defined in claim 1, wherein each of the intake barrels of the first and second carburetors includes an intersecting portion which is constituted of an air horn made of resilient material such as rubber or the like.

3. A carburetion system as defined in claim 1 or 2, further comprising a float disposed in each of said float chambers for moving up and down in conformance with change of fuel level in the float chamber, a float valve actuated by means of said float so as to keep the fuel level constant and fuel passage means for introducing fuel from said float chamber into the intake passage, said fuel passage means including a portion which extends into the float chamber at a certain angle inclined relative to the axis of said intake passage, said float being adapted to move in parallel to the axis of said portion of the fuel passage means extending into the float chamber.

4. A carburetion system as defined in claim 3, wherein said fuel passage means comprises a slow fuel passage having a slow fuel pipe extending into the float chamber and a main fuel passage having a main fuel pipe extending into said float chamber, said slow fuel pipe and main fuel pipe extending in parallel to one another and being located as close as possible to the center of the fuel surface.

* * * * *